Patented Nov. 12, 1940

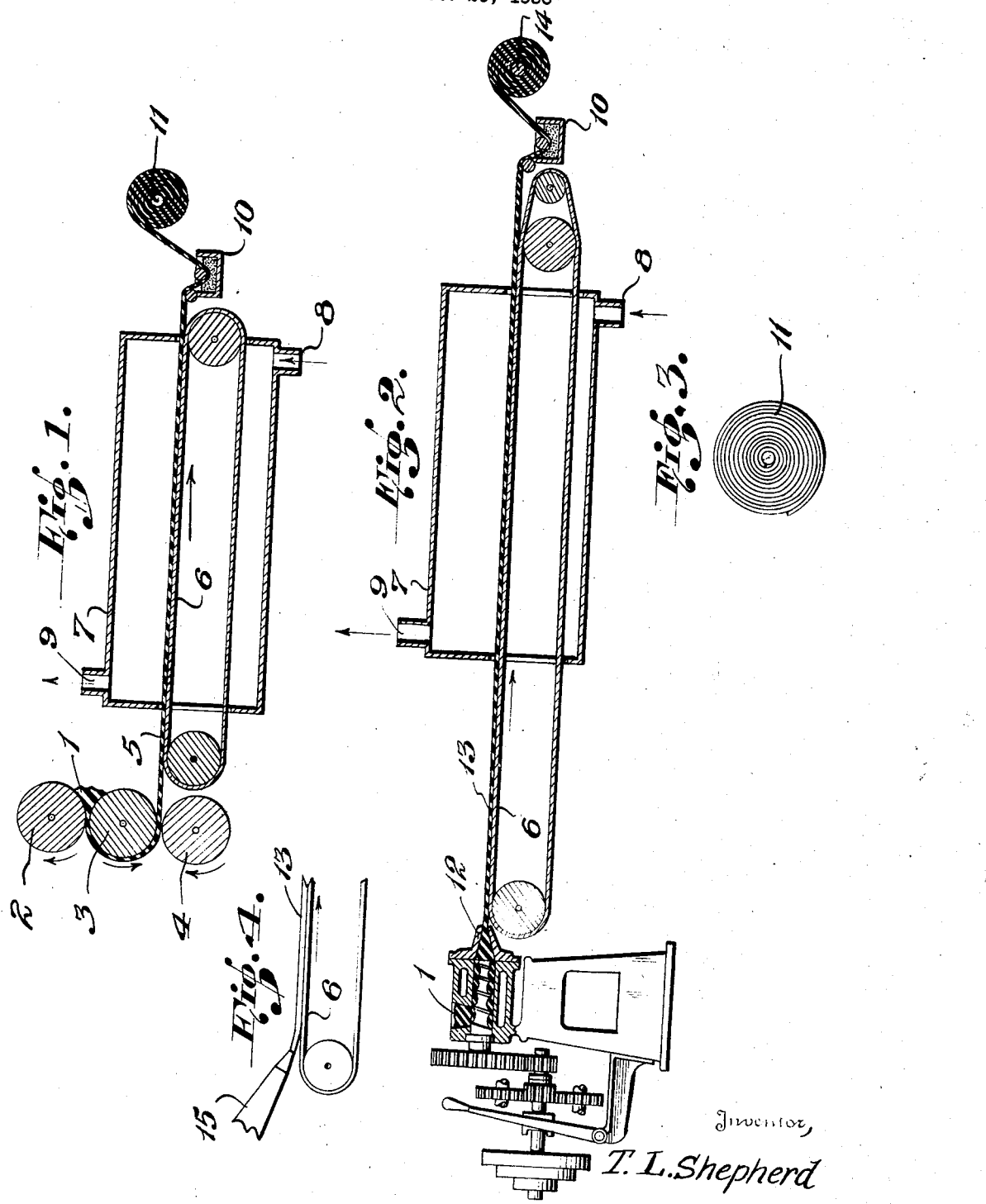

2,221,316

UNITED STATES PATENT OFFICE 2,221,316

RUBBER PROCESS

Thomas Lewis Shepherd, London, England

Application October 26, 1936, Serial No. 107,723
In Great Britain November 4, 1935

16 Claims. (Cl. 18—54)

This invention relates to rubber processes and products in which rubber is manufactured in thread, filament or tape form.

The object of the invention is to provide rubber in such form, which will be capable of being woven, knitted, or the like with facility during the preparation of fabrics, and also to provide methods both of forming such rubber threads or the like and of weaving, knitting, and the like the rubber into fabrics.

Rubber in thread, tape, or filament form may be manufactured by extruding latex with or without other ingredients such as activators, accelerators, reinforcing fillers, anti-oxidants and stabilisers.

In my British Patent Specifications Nos. 447,972, 448,098, 449,314 and 449,462, and in my U. S. patent applications Nos. 34,855, 40,859 and 72,219, I described processes in which there is mixed with the latex or latex mixture or with a liquid coagulent for the latex various substances, such as glue, gelatine and similar proteins, casein, albumen, natural and synthetic resins and gums which are water soluble, cellulose esters and ethers (e. g. methyl cellulose) and inorganic (e. g. sodium silicate) or organic (e. g. sugar) substances, which dissolve in water to give solutions which are miscible with latex without coagulation and which on evaporation yield a coherent water soluble film. When the latex mixture is extruded into a liquid coagulent or is otherwise formed into thread by coagulating the rubber, and dried, a thread is produced, which may be woven or otherwise manipulated without the difficulties associated with extensible threads. For this reason I have called substances which have this property "setting" or extensibility-reducing agents.

I have found that such a setting agent may be used when threads, filaments or tapes are cut from rubber sheet, and that the presence of the setting agent renders the cutting easier.

I have also found that such a setting agent may be used when not a latex but a compounding process is employed.

A rubber sheet may be prepared from ordinary masticated rubber such as para, crepe or smoked sheet, to which the usual compounding ingredients may have been added such as sulphur, accelerators, anti-agers, softeners and inert fillers, or it may be prepared directly from latex, natural or concentrated, to which there may have been added compounding agents such as those above mentioned. In the latter case, when the sheet rubber is prepared by spreading a latex mix, I have found that the setting agent present acts as a stabiliser and reduces the tendency of the mix to form coagulum under the spreading knife.

In the case of compounding, the masticated rubber, the setting agent and the desired vulcanising, anti-ageing and softening agents may be mixed together in the usual way on a mill and, when thoroughly mixed, the stock may be dissolved in suitable solvents. The resulting compounded dough may be then extruded in the form of threads, tapes or filaments on to a travelling belt or a rotating drum along which the threads travel until dry. They are then powdered, bobbined or hanked ready for any further treatment.

The invention is not limited therefore to the cutting of rubber sheet into thread but comprises also the extrusion or other method of forming threads from a compounded rubber dough or solution.

The object of the invention is a method of making substantially inextensible rubber threads adapted for weaving into a fabric, the elasticity of the thread being subsequently restored, comprising forming a mix of rubber containing a proportion of an extensibility reducing agent sufficient to render the threads substantially inelastic, forming the mix into threads and setting the rubber and extensibility reducing agent.

Other objects of the invention will be clear from the following description.

In carrying the invention into effect by way of example the setting agent is first thoroughly dispersed in the rubber on a normal rubber compounding mill. Preferably a vulcanisable compound is thus prepared.

For the production of thread from this mix normal practises may be followed. Thus, when the dispersion of the glue in the rubber has been achieved, the mix is calendered out into very thin sheets which, when the rubber compound is unvulcanised, are then vulcanised and finally cut into threads by thread cutting machines of the type generally used.

If desired, the above mix is dissolved in a suitable rubber solvent (e. g. a solvent naphtha) and thoroughly stirred until a smooth dough is obtained.

In the case of certain setting agents, for example, glue, it may be necessary to add a small quantity of water to smooth out the solution should the glue not be soluble in the rubber solvents. The addition of the water followed by fine milling in a colloid mill gives an emulsion of glue solution in rubber dough. This emulsion may then be utilised for the production of thread by any of the known methods which employ dough for the base.

Such methods will include the extrusion of the dough on to a belt and the subsequent removal of the solvent, and the printing and spreading of such a dough to give threads.

The thread thus prepared if suitable proportions of setting agent have been used will be found to be inextensible, or nearly so, depending on the amount of setting agent employed, and may be woven or knitted in the same way as a normal textile thread with or without the presence of textile threads.

The resultant flat non-elastic fabric is then subjected to an operation which will remove the setting agent in the thread, i. e. subjecting it to steam or contact with a hot or boiling liquid. If glue has been used then this operation will consist of immersing the cloth in hot or boiling water until the glue in the thread has been washed out.

The final thread, and consequently the fabric, will be elastic.

A previously determined stretch may be imparted to the thread before weaving, so that after removal of the setting agent the thread will resume a shorter length. Owing to the fact that the thread does not stretch during the weaving or knitting or other operation, the threads lying in the fabric will be all of the same tension and after removal of the setting agent the cloth will be of an even width and free from ruckles and ridges and the like.

For example, if desired, the thread may be steamed and then stretched to any required elongation and dried in this predetermined stretched condition where it will remain. In this predetermined stretched condition such dried and stretched thread is non-elastic and will weave or knit to produce smooth flat fabrics without puckering.

In the case when a non-vulcanised rubber has been employed vulcanisation may be carried out before desetting and weaving or may be carried out during or after the desetting operation. Vulcanisation is not necessary when using an already vulcanised rubber in a latex mix.

In addition, the set thread may be dyed in the same way as cotton, wool or silk and the like, and the dyeing may take place during the desetting operation, when this takes place by means of immersion in a liquid, for example, hot or boiling water.

It is possible to carry out the invention by preparing compounded mix, subjecting it to the action of a solvent, and then adding a solution of setting agent, after which the resulting mix may be passed through a colloid mill.

The following processes are given by way of example:

*Example 1*

The following stock is prepared in the usual manner in a rubber mixing mill:

| | Parts by weight |
|---|---|
| Rubber | 100 |
| Mercaptobenzthiozole (as an accelerator) | 1.25 |
| Tetramethylthiuramdisulphide (as an accelerator) | 0.125 |
| Sulphur | 2.5 |
| Zinc oxide | 5.0 |
| Scotch glue | 80.0 |
| Montan wax | 5.0 |
| Stearic acid | 2.0 |

This is warmed up and calendered to the desired thickness of the rubber thread. The sheets are vulcanised and cut by thread cutting machines into thread of the desired thickness.

The resultant cut thread when dried is practically inelastic and may be woven directly in a cloth in the same way as a textile thread, with or without the presence of textile threads. The threads of rubber will lie in the fabric without tension and thus give a fabric of an even finish and appearance.

*Example 2*

A rubber mix is made as in Example 1, or a master rubber/glue mix is used and the mix made up to the same composition as in Example 1. The stock is dissolved in a solvent naphtha, and after the rubber base has dissolved the deposit of glue is dissolved in water (three parts of water by weight to one of glue).

The resultant mix is passed through a colloid mill and the dough is extruded in the thread form on to a traveling belt which passes over hot plates. The solvent and the water are gradually driven off and the set rubber/glue thread finally obtained is chalked and collected on a spool. This may be vulcanised or stretched if desired before weaving. The woven cloth is immersed in hot water until such a time as the glue is dissolved out of the thread, this leaves the fabric perfectly elastic and quite flat and regular. If the rubber is in the unvulcanised condition, it can now be vulcanised in dry heat.

Alternatively, the dough (i. e. the compounded mix with solvent) is spread, as may be done by means of an ordinary rubber spreading machine, into a thin blanket which is then dried by heat and the thin blanket is then cut up by the usual thread cutting machines.

*Example 3*

A mixture is prepared of the following composition:

| | Parts by weight |
|---|---|
| 70% Concentrated latex | 130 |
| Sulphur | 2.25 |
| Zinc oxide | 3.0 |
| Zinc diethyldithiocarbamate | 0.75 |
| The substance known commercially as Flectol H (as an anti-ager) | 0.5 |
| The substance known commercially as Vulcastab A (as a stabiliser) | 4.0 |

The powders in the above are moistened and mixed with the Vulcastab A and the paste is added to the latex. The whole is milled till the solids are well dispersed.

To 112.5 parts by weight of such a mixture there is added whilst stirring 60 parts by weight of a solution consisting of:

| | Parts by weight |
|---|---|
| Scotch glue | 1 |
| Water | 2 | which has been left for about six hours and then heated to 50° C. to render it liquid.

The whole is then milled and sieved. The mix is spread into the form of thin sheets on a spreading machine and the temperature during spreading is so arranged that the mix has the desired viscosity. Owing to the presence of the glue, the viscosity may be considerably increased by lowering the temperature or, if a thinner mix is required, a rise in temperature will bring about the desired change.

The prepared sheets are then thoroughly dried and cut up into thread of the desired thickness. The set threads are woven into fabric and the resultant cloth is boiled in water for one hour. This operation will not only deset the thread, leaving the fabric fully elastic, but will also vulcanise the rubber.

The process may be practised by various types of apparatus, but for the purposes of illustration, several forms of apparatus for practising the process are shown in the accompanying drawing wherein:

Fig. 1 is a sectional view in elevation of a device for forming and drying a sheet of the rubber mix;

Fig. 2 is a partly sectional view in elevation of a device for forming and drying a thread or plurality of threads of the rubber mix;

Fig. 3 is an elevational view of a roll of the dried sheet made according to the apparatus shown in Fig. 1, and Fig. 4 is a modification of a part of the device shown in Fig. 2;

Referring to the drawing, particularly Fig. 1, the masticated rubber-glue mix 1 which contains all other necessary ingredients and which may also contain a rubber solvent as plasticiser, is passed between the upper rollers 2 and 3, the lower roller 4, being adjusted to the desired thickness of the sheet 5 to be formed. Sheet 5 then passes on the endless band 6 through a drying and vulcanizing chamber 7, through which hot air or gas passes by means of parts 8 and 9 in order to evaporate the solvent which may be recovered by any known manner. After passing through chamber 7, the sheet 5 passes through the talcing box 10 and is then wound into a tight roll 11, as shown in Fig. 3. The threads are cut from the roll 11 by any known cutting device.

In Fig. 2, an arrangement is illustrated in which the mix 1, is forced through a die, 12, or a plurality of such dies to form a thread 13 or a plurality of threads, which are carried on an endless belt, 6, through a drying and vulcanizing chamber 7 as before and then through a talcing box, 10. The thread 13 is then wound on a drum 14 or bobbins.

Figure 4 shows an alternate method of forming threads which is employed when emulsions of glue and rubber solutions are used. The nozzle 15 or a plurality thereof are supplied with the emulsion either by gravity or pumps and the extruded thread, 13, is passed onto the endless belt 6 for further treatment as hereinbefore described.

What I claim is:

1. A method of making substantially inextensible rubber threads adapted for weaving into a fabric, the elasticity of the thread being subsequently restorable, comprising forming a mix of rubber containing a proportion of a removable soluble hydrophilic colloid sufficient to render the threads substantially inelastic, forming the mix into threads and setting the rubber and hydrophilic colloid.

2. A method of making substantially inextensible rubber threads adapted for weaving into a fabric, the elasticity of the thread being subsequently restorable, comprising forming a mix of rubber containing a proportion of glue sufficient to render the threads substantially inelastic and containing water and solvent naptha, extruding said mix to form threads and drying said threads to set the glue.

3. A method of making substantially inextensible rubber threads adapted for weaving into a fabric, the elasticity of the thread being subsequently restorable, comprising forming a mix of rubber containing a proportion of glue sufficient to render the threads substantially inelastic, forming a sheet from said mix, drying the sheet to set the glue and cutting said sheet into threads.

4. The method of making substantially inextensible rubber threads as claimed in claim 2, and further comprising stretching the dried threads in the presence of steam and again drying the threads to set the glue whereby threads are obtained having a predetermined shrinking capacity.

5. The method of making substantially inextensible rubber threads as claimed in claim 3, and further comprising stretching the threads in the presence of steam and again drying the threads to set the glue, whereby threads are obtained having a predetermined shrinking capacity.

6. A method of making substantially inextensible rubber threads adapted for weaving into a fabric, the elasticitly of the thread being subsequently restorable, comprising forming a mix of rubber containing a proportion of glue sufficient to render the threads substantially inelastic, extruding said mix to form threads and drying said threads to set the glue.

7. A method of making substantially inextensible rubber threads adapted for weaving into a fabric, the elasticity of the thread being subsequently restorable, comprising forming a mix of rubber containing a proportion of glue sufficient to render the threads substantially inelastic and containing solvent naphtha, extruding said mix to form threads and drying said threads to set the glue.

8. Method of making substantially inextensible rubber threads comprising forming a mix of rubber containing a proportion of a removable soluble hydrophilic colloid sufficient to render the thread substantially inelastic, and also containing solvent naphtha to plasticize the rubber, forming the said mix into a sheet, evaporating the solvent, setting the hydrophilic colloid, and forming the sheet into threads.

9. The method of making substantially inextensible rubber threads as claimed in claim 1 wherein the method of forming the mix into threads comprises the steps of forming the mix into a sheet and cutting said sheet into threads subsequent to the setting of the hydrophilic colloid.

10. The method of making substantially inextensible rubber threads as claimed in claim 1 wherein the method of forming the mix into threads comprises the steps of forming the mix into a sheet and cutting said sheet into threads prior to the setting of the hyrophilic colloid.

11. The method of making substantially inextensible rubber threads as claimed in claim 1, wherein the mix contains a solvent for the rubber and a solvent for the hydrophilic colloid and wherein the method of forming the mix into threads comprises the step of extruding the mix.

12. The method of making substantially inextensible rubber threads as claimed in claim 1, wherein the method of forming the mix into threads comprises the step of extruding the mix.

13. The method of making substantially inextensible rubber threads as claimed in claim 1, wherein the mix contains a solvent for the rubber and wherein the method of forming the mix into threads comprises the step of extruding the mix.

14. Process for producing rubber goods, such as sheets, strips, filaments and the like, in a substantially inelastic state, capable of being thereafter elasticized, which comprises: forming a rubber composition mix containing a soluble extensibility-reducing agent and sufficient solvent therefor to dissolve said agent, said agent being present in sufficient amount to render said composition relatively inelastic on drying, forming said mix into said goods, and thereafter drying the same.

15. Process for producing rubber goods, such as sheets, strips, filaments and the like, in a sustantially inelastic state, capable of being thereafter elasticized, which comprises: forming a rubber composition mix containing an extensibility-reducing agent, soluble in aqueous solution, and sufficient solvent therefor to disslove the same, said agent being present in sufficient amount to render said composition relatively inelastic on drying, forming said mix into said goods, and thereafter drying the same.

16. Process for producing rubber thread in a substantially inelastic state, capable of being thereafter elasticized, which comprises: forming a rubber composition mix containing a soluble extensibility-reducing agent and sufficient solvent therefor to dissolve said agent, said agent being present in sufficient amount to render said composition relatively inelastic on drying, forming said mix into a thread, stretching the thread while moist, and drying.

THOMAS LEWIS SHEPHERD.